W. R. MENGEL.
OPTICAL PROJECTION APPARATUS.
APPLICATION FILED DEC. 20, 1920. RENEWED MAY 19, 1922.

1,434,219.

Patented Oct. 31, 1922.

Witness:
Arthur C. Wright

Inventor
William R. Mengel.
By Robert Burns
Attorney.

Patented Oct. 31, 1922.

1,434,219

UNITED STATES PATENT OFFICE.

WILLIAM R. MENGEL, OF CHICAGO, ILLINOIS, ASSIGNOR TO CHRISTEN J. PETERSON OF OAK PARK, ILLINOIS.

OPTICAL PROJECTION APPARATUS.

Application filed December 20, 1920, Serial No. 431,855. Renewed May 19, 1922. Serial No. 562,268.

*To all whom it may concern:*

Be it known that I, WILLIAM R. MENGEL, a citizen of the United States of America, and a resident of Chicago, in the county of Cook, State of Illinois, have invented certain new and useful Improvements in Optical Projection Apparatus, of which the following is a specification.

This invention relates to means for intercepting and dispersing the heat rays from the electrical illuminating means of optical projecting apparatus of the type constituting the subject matter of my prior Letters Patent No. 1,342,561, dated June 8, 1920, and has for its object—

To provide a structural formation and combination of parts in stereopticons and like optical projecting apparatus, adapted to intercept and dissipate the heat rays in the light path in a simple and effective manner, with a view to provide against undue heating and ignition of the inflammable picture film now generally used in such type of apparatus, all as will hereinafter more fully appear, In the accompanying drawing:—

Like reference numerals indicate like parts in both views.

Figure 1:
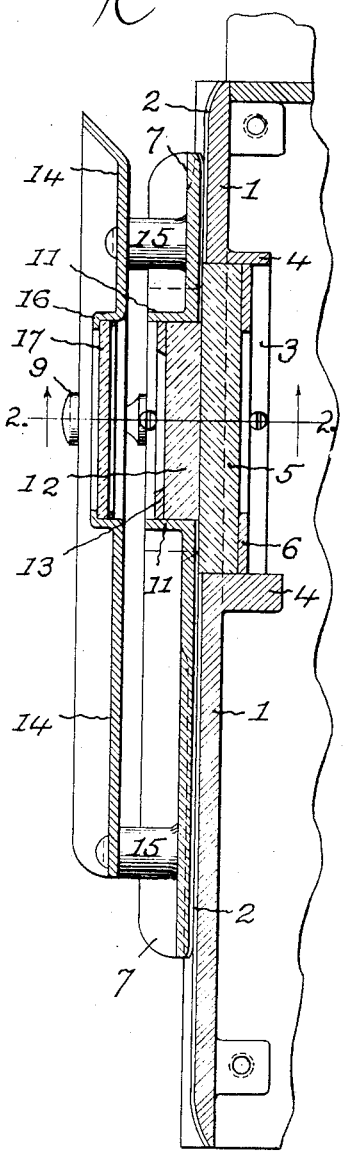
Fig. 1, is a vertical section on line 1—1 Fig. 2, of the film and objective carrying frame of an optical projection apparatus, having the present invention applied.
Figure 2:
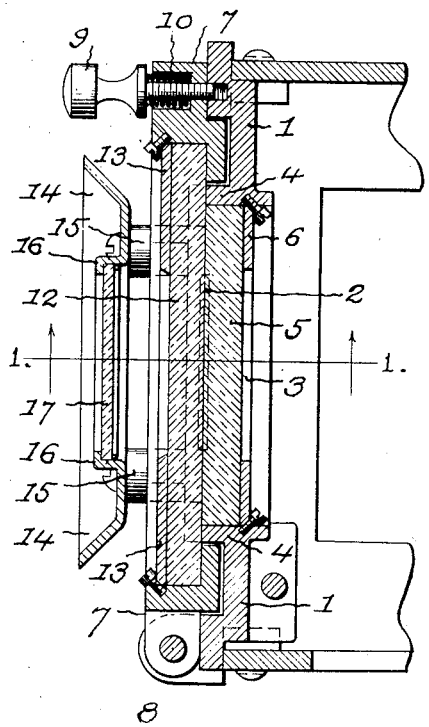
Fig. 2, is a horizontal section on line 2—2 Fig. 1.

Referring to the drawing 1, designates the vertical rear wall of the supporting frame or housing for the film mechanism and the objective of an optical projection apparatus of the construction shown in my prior Patent No. 1,342,561, formed with a vertical channel 2 for the guidance of the picture film and with the usual light passage 3 intermediate the width of said channel and intersecting the light path of the apparatus. In the present construction the light passage 3 is provided with a marginal flange or rim 4 adapted to receive a sheet or panel 5 of glass or like transparent material, held in place in a detachable manner by a confining frame 6 as shown, to provide a bearing surface for the portion of the picture film in the light path of the apparatus.

7 designates the film confining gate of the structure, arranged to swing horizontally on a vertical side pivot 8 and provided at its free end with a fastening screw 9 and interposed spring 10, by which the gate is secured to the vertical wall 1 in a resilient manner. The gate 7 is formed with a vertical channel adapted to register with the aforesaid channel 2 to aid in the guidance of the picture film, and with a light passage in line with the light passage 3 and with the light path of the apparatus. In the present construction said light passage of the gate 7 is provided with a marginal rim or flange 11 adapted to receive a sheet or panel 12 of glass or like transparent material held in place by a confining frame 13 as shown so as to provide a bearing surface for the portion of the picture film in the light path of the apparatus.

14 designates a plate member of a similar detail construction to a like plate number in my aforesaid Patent No. 1,342,561, and secured to the rear face of the film gate 7 by distance studs 15 to afford an open space between the parts and provide a ventilating passage for the air to aid in carrying away the heat which is communicated to the parts in actual use. The plate member 14 is formed with a light passage arranged in the light path of the apparatus and is provided with a marginal rim or flange 16 adapted to receive a sheet or panel 17 of glass or like transparent material as shown.

With the present construction the panels or sheets 5, 12, and 17 act in a very effective manner to intercept heat rays passing along the light path of the apparatus, and conduct the same to the metallic holding parts from which the heat is carried away by the usual ventilating provisions of the enclosing casing of the apparatus.

Having thus fully described my said invention what I claim as new and desire to secure by Letters Patent, is:—

1. In an optical projection apparatus of the type described, the combination of a housing wall formed with a guide channel for a picture film and with a light passage having marginal flanges, a sheet of transparent material fitted in said marginal flanges, a film confining gate hinged to the housing wall and formed with a light passage having marginal flanges, and a sheet of transparent material fitted in said marginal flanges, said marginal flanges of the wall and gate passages affording effective heat conducting connections between said wall, gate and transparent sheets for the dissipation of the intercepted heat rays.

2. In an optical projection apparatus of the type described, the combination of a housing wall formed with a guide channel for a picture film and with a light passage having marginal flanges, a sheet of transparent material fitted in said marginal flanges, a film confining gate hinged to the housing wall and formed with a light passage having marginal flanges, a sheet of transparent material fitted in said marginal flanges, a plate member secured in spaced relation to the rear face of the film gate to provide a ventilating duct between the parts, said plate member having a light passage provided with marginal flanges, and a sheet of transparent material fitted in said flanges.

Signed at Chicago, Illinois, this 15th day of December, 1920.

WILLIAM R. MENGEL.